(12) United States Patent
Arora et al.

(10) Patent No.: US 11,915,106 B2
(45) Date of Patent: Feb. 27, 2024

(54) MACHINE LEARNING FOR DETERMINING SUITABILITY OF APPLICATION MIGRATION FROM LOCAL TO REMOTE PROVIDERS

(71) Applicant: Kyndryl, Inc, New York, NY (US)

(72) Inventors: Pritpal S. Arora, Bangalore (IN); Klaus Koenig, Essenheim (DE)

(73) Assignee: KYNDRYL, INC., New York, NY (US)

( * ) Notice: Subject to any disclaimer, the term of this patent is extended or adjusted under 35 U.S.C. 154(b) by 902 days.

(21) Appl. No.: 16/924,441

(22) Filed: Jul. 9, 2020

(65) Prior Publication Data

US 2022/0012627 A1    Jan. 13, 2022

(51) Int. Cl.
*G06F 9/46* (2006.01)
*G06N 20/00* (2019.01)
*G06F 9/48* (2006.01)
*G06F 8/76* (2018.01)
*G06F 8/77* (2018.01)

(52) U.S. Cl.
CPC ........... *G06N 20/00* (2019.01); *G06F 9/4856* (2013.01); *G06F 8/76* (2013.01); *G06F 8/77* (2013.01)

(58) Field of Classification Search
CPC ............. G06F 9/4856; G06F 8/76; G06F 8/77
See application file for complete search history.

(56) References Cited

U.S. PATENT DOCUMENTS

| | | | |
|---|---|---|---|
| 9,515,993 | B1 | 12/2016 | Iwang et al. |
| 9,612,767 | B2 | 4/2017 | Huang et al. |
| 9,705,970 | B2 | 7/2017 | Pomerantz et al. |
| 9,727,366 | B2 | 8/2017 | Dow et al. |
| 9,772,830 | B2 | 9/2017 | Balasubramanian |
| 10,620,991 | B1* | 4/2020 | Lindner ................ G06F 9/5077 |
| 2012/0304179 | A1 | 11/2012 | Devarakonda et al. |
| 2014/0122577 | A1 | 5/2014 | Balasubramanian |
| 2014/0258487 | A1 | 9/2014 | Heninger et al. |
| 2014/0258539 | A1 | 9/2014 | Heninger et al. |
| 2015/0032894 | A1 | 1/2015 | Rosenweig et al. |
| 2015/0156131 | A1 | 6/2015 | Pomerantz et al. |

(Continued)

FOREIGN PATENT DOCUMENTS

CN         102917025 A         2/2013

OTHER PUBLICATIONS

Mell et al., "The NIST Definition of Cloud Computing", NIST Special Publication 800-145, 2011, 7 pages.

(Continued)

*Primary Examiner* — Diem K Cao
(74) *Attorney, Agent, or Firm* — Tutunjian & Bitetto, P.C.; Dan Housley

(57) ABSTRACT

A computer implemented method is provided that includes using historic migration data to label key performance indicators (KPIs) in a migration model including a scale that indicates a level of successful migration to a remote provider. Employing the migration model to predict successful migration of a local application having one or more of said one or more of local key performance indicators for the local application. Migrating the local application to a remote provider when the model to predict successful migration indicates a greater than threshold value for successful migration.

19 Claims, 10 Drawing Sheets

(56) References Cited

U.S. PATENT DOCUMENTS

| | | | |
|---|---|---|---|
| 2016/0092813 A1* | 3/2016 | Baker | G06Q 10/06313 |
| | | | 705/7.23 |
| 2017/0012854 A1 | 1/2017 | Balasubramanian | |
| 2017/0024260 A1 | 1/2017 | Chandrasekaran et al. | |
| 2017/0288982 A1 | 10/2017 | Katsaros et al. | |
| 2018/0330298 A1 | 11/2018 | Chen et al. | |
| 2019/0095233 A1* | 3/2019 | Iikura | G06F 9/5077 |
| 2019/0149617 A1* | 5/2019 | Gao | H04L 67/34 |
| | | | 709/223 |
| 2020/0264919 A1* | 8/2020 | Vukovic | G06N 20/00 |

OTHER PUBLICATIONS

Turner et al., "Critical Application And Business KPIs For Successful Cloud Migration" IDC: AppDynamics (Aug. 2017) pp. 1-14.

\* cited by examiner

Approximation Function:
f(x) = +.07*x(4)-133.14*x(3)+12613.32*x(2)-597140.4*x+1.130202514E7

MACHINE LEARNING FOR DETERMINING SUITABILITY OF APPLICATION MIGRATION FROM LOCAL TO REMOTE PROVIDERS

BACKGROUND

The present invention generally relates to migrating computer related applications to a cloud environment.

Migration of computer related components involving moving system images, applications and data from one computing environment to another. Traditionally, migration techniques are selected manually based on limited decision criteria. Therefore, traditional migration techniques do not provide for optimization during the migration.

SUMMARY

In accordance with an embodiment of the present invention, a method is provided for migrating applications to cloud environments. The migration can be for an application that is being run locally, or the migration can be for an application to be moved from a first cloud provider to a second new cloud provider. In some embodiments, the migration methods and tools can enable cloud to cloud migration in a multi-cloud migration scenario.

In one embodiment, a computer implemented method is provided that includes normalizing historical key performance indicators to provide a normalized scale of non-successful to successful migration of applications based on historical values. The normalized scale is transformed into a migration model. In a following step, key performance indicators for a target application migration are entered into the migration model to provide an output for a probability of successful migration. A simulation employing the migration model is executed, wherein migration modifying key performance indicators are input into the migration model for the simulation. The application is modified to increase the likelihood of a successful migration when the migration modifying key performance indicators increase the probability of success of migration in the simulation to be greater than the output for the probability of successful migration from the migration module.

In another embodiment, a system is provided that employs a multi-criteria migration analyzer to predict successful migration for applications. In one embodiment, the method includes a key performance indicator evaluation engine for producing a migration model from historical key performance indicators. The system further includes a migration probability engine for evaluating input key performance indicators for a target application migration in the migration model to provide an output for a probability of successful migration. The system also includes a recommendation engine for executing a simulation employing the migration model, wherein migration modifying key performance indicators are input into the migration model for the simulation. The recommendation engine provides for modification of the target application to increase a likelihood of a successful migration. The modification of the target application including the key performance indicators that increases the probability of success of migration in the simulation to be greater than the output for the probability of successful migration from the migration probability engine.

In yet another aspect, a computer program product is provided for migrating applications that includes a computer readable storage medium having computer readable program code embodied therewith. In some embodiments, the program instructions are executable by a processor to cause the processor to normalize historical key performance indicators to provide a normalized scale of non-successful to successful migration of applications based on historical values; and transform the normalized scale into a migration model. The program instructions further include inputting key performance indicators for a target application migration into the migration model to provide an output for a probability of successful migration. The program instructions further include executing a simulation employing the migration model, wherein migration modifying key performance indicators are input into the migration model for the simulation. The program instructions further include modifying the application to increase the likelihood of a successful with key performance indicators that increase the probability of success of migration in the simulation to be greater than the output for the probability of successful migration from the migration model.

DETAILED DESCRIPTION

Figure 1:
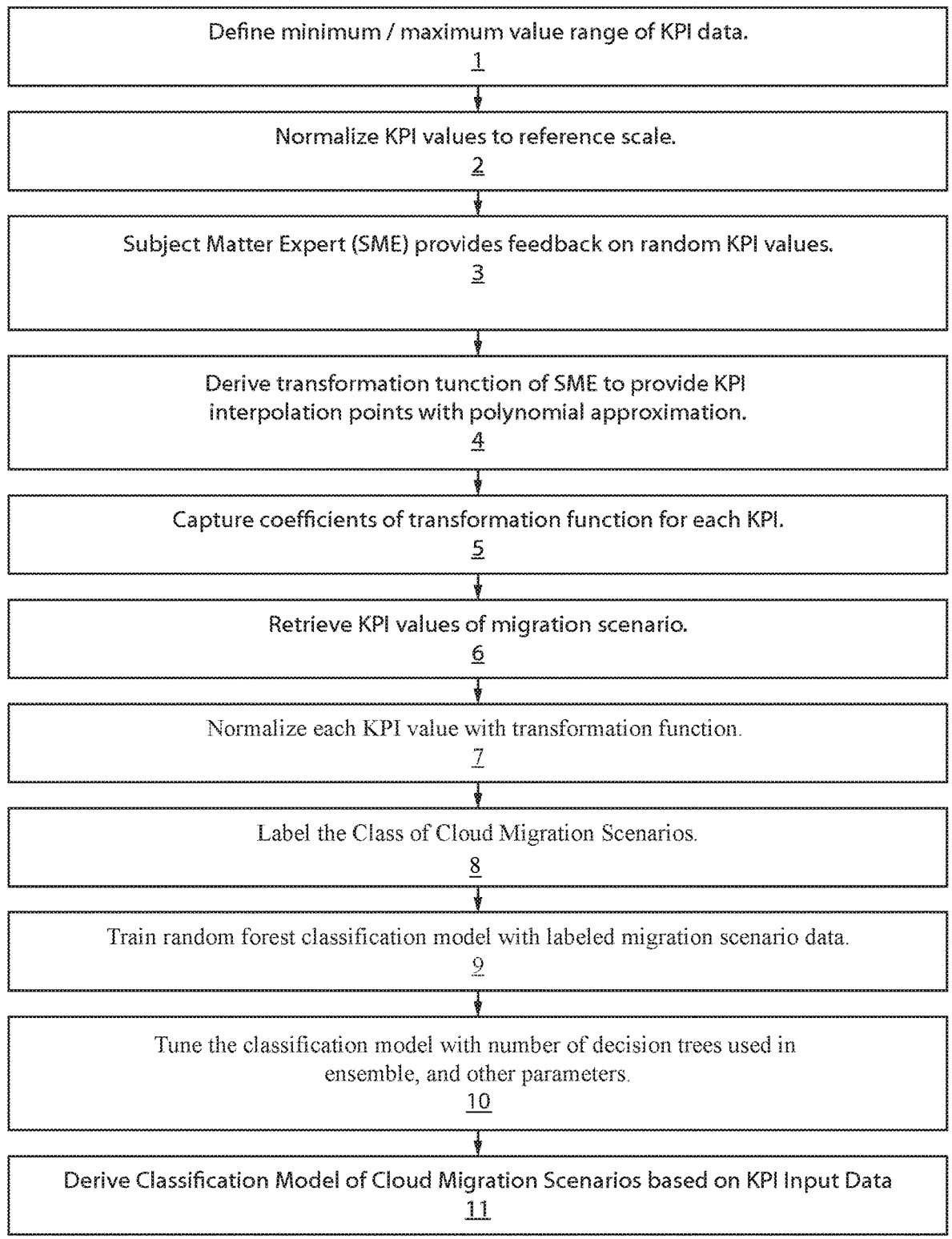
FIG. 1 is a block/flow diagram illustrating one embodiment of an offline learning cycle of key performance indicators (KPI) normalization for a method for migration of local applications to a cloud environment using a multi-criteria (key performance indicator (KPI)) migration analyzer.

The methods, systems and computer program products described herein can provide a transformative key performance indicator (KPI) evaluator engine with multiple criteria for feasibility analysis of multi-cloud migrations, such as multi-cloud migrations. It has been determined that cloud migration methods prior to those of the present disclosure are based on individual aspects of a cloud migration, e.g., focus on services, they are static, and they do no cover the full IT stack (e.g. Infrastructure only), etc.

The methods, systems and computer program products of the present disclosure provide a holistic end to end (E2E) approach to move an application from a local or landscape basis to a cloud environment, which can make full use of the benefits of a cloud environment. The methods systems and computer program products that are described herein can also provide for migrating an application from an existing cloud provider to one or more new cloud providers.

In some embodiments, a multi-criteria migration analyzer is described that can analyze the feasibility of migration of a suitable application landscape to multi-provider cloud environment from a business as well as from a technical perspective. The key performance indicator (KPI) evaluator can automatically analyze the migration of workloads, which are currently on legacy environment into a hybrid, multi-vendor/multi-cloud environment. The systems, methods and computer program products can recommend a go-no-go decision for a client whether it is ready for migration and a given workload if it is ready for migration. The multi-criteria (key performance indicator (KPI)) migration analyzer of application landscape to multi-provider cloud environments is applicable for multi-vendor/multi-cloud Environment and it includes a cognitive component. In some embodiments, the multi-criteria (key performance indicator (KPI)) migration analyzer of application landscape to multi-provider cloud environments employs machine learning (ML). Scoring of Multiple Criteria basis of the various KPIs from multiple dimensions as business continuity, service quality, operational maturity, associated costs, etc. The machine learning approach is used so that the methods, systems and computer program products can autonomously identify the relationships between various KPI's contributing to a successful or failed migration, and analyze the various outcomes with different KPI's. The analysis can be across dimensions, obtaining feedback from different KPI weights, transform curves, classifiers and historic failure scenarios, etc.

In some embodiments, the multi-criteria (key performance indicator (KPI)) migration analyzer of application landscape to multi-provider cloud environments can act as a simulator for identifying and assessing multiple scenarios for migration and performing a 'What-if' analysis on multiple migration scenarios. The migration analyzer can provide recommendations for increasing the probability of a successful migration scenario. For instance, the migration analyzer can determine to what extent parameters/KPIs can be adjusted to promote a successful migration, or when predicted as problematic scenario how to turn it in a successful one. This can include the adjustment of weights, transformation curves, and different KPI combinations.

The adjustment of KPI's leading to a higher probability of a successful migration is hereby acting as a guideline of what aspects of the IT environment (e.g. resilience aspects) or architectural components should be altered to make it more successful. Thus, the outcome of the simulation is providing recommendations of elements of refactoring the legacy workload and its infrastructure components.

In some embodiments, the multi-criteria (key performance indicator (KPI)) migration analyzer of application landscape to multi-provider cloud environments supports a self-learning mechanism with a key performance indicator (KPI) tuning predictive model (with various KPIs, KPI dimensions, KPI associations for a successful/failed migration, etc.) and continuous feedbacks from the historic migration issues. The multi-criteria (key performance indicator (KPI)) migration analyzer of application landscape to multi-provider cloud environments can build on recommendations for improving the probability of migration and suggests suitable contributing KPI criteria. The method, systems and computer program products of the present disclosure are now described in greater detail with reference to FIGS. 1-10.

Figure 2:
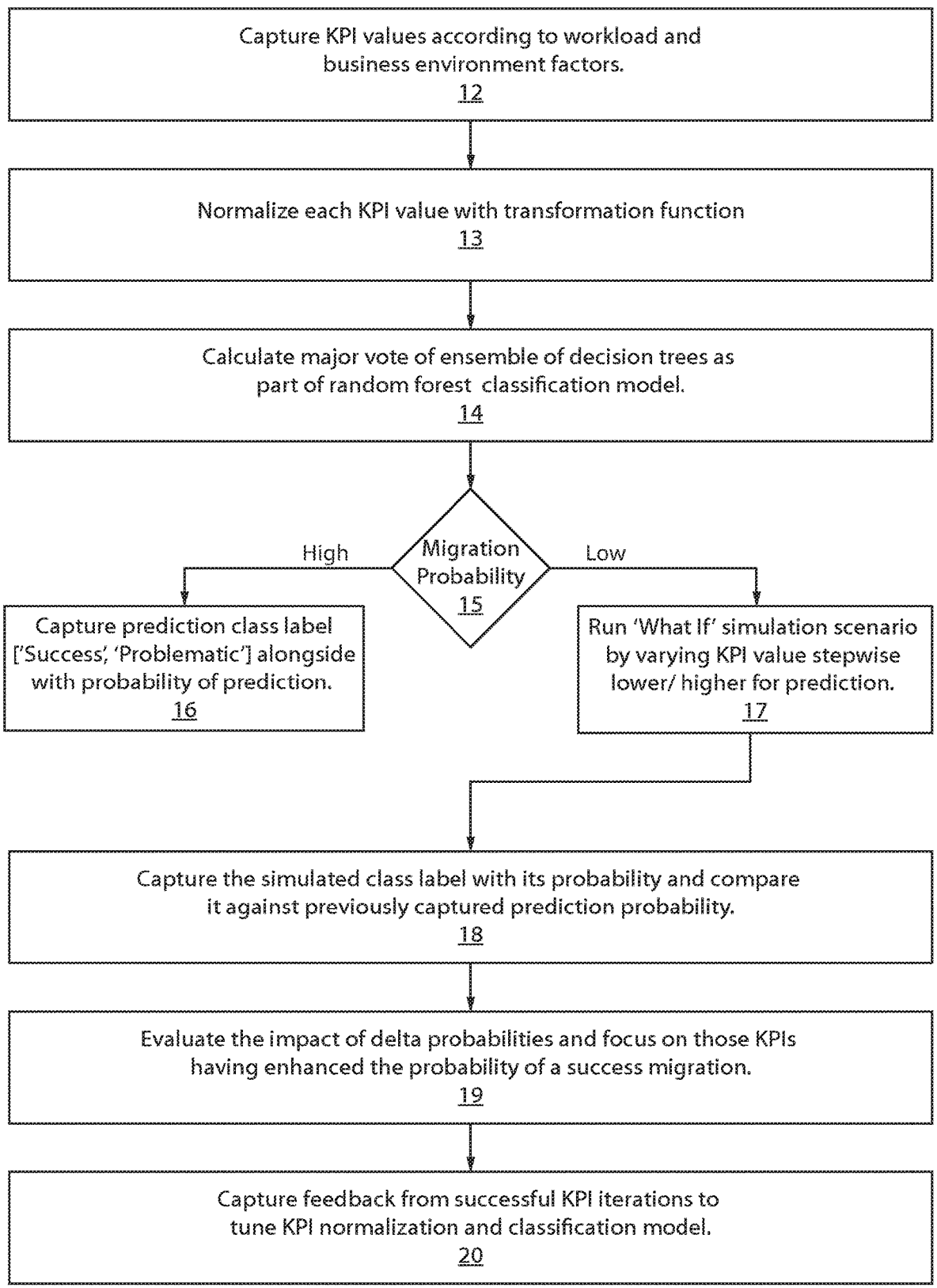
FIG. 2 is a block/flow diagram illustrating one embodiment of runtime prediction of workloads from a business environment for migration to the cloud using model built using the process flow depicted in FIG. 1.
Figure 3:
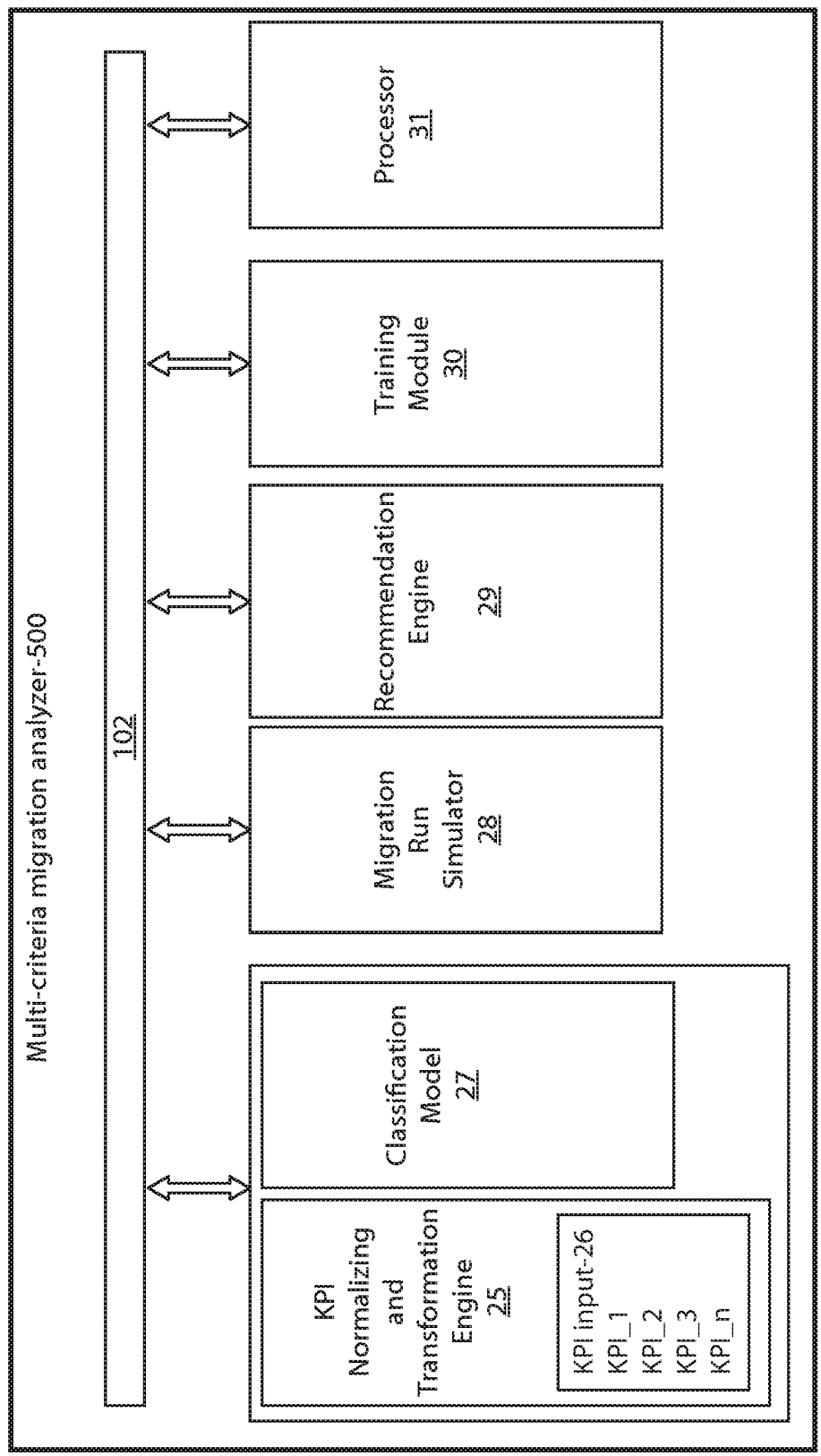
FIG. 3 is a block diagram illustrating one embodiment of system including the multi-criteria (key performance indicator (KPI)) migration analyzer.
Figure 4:
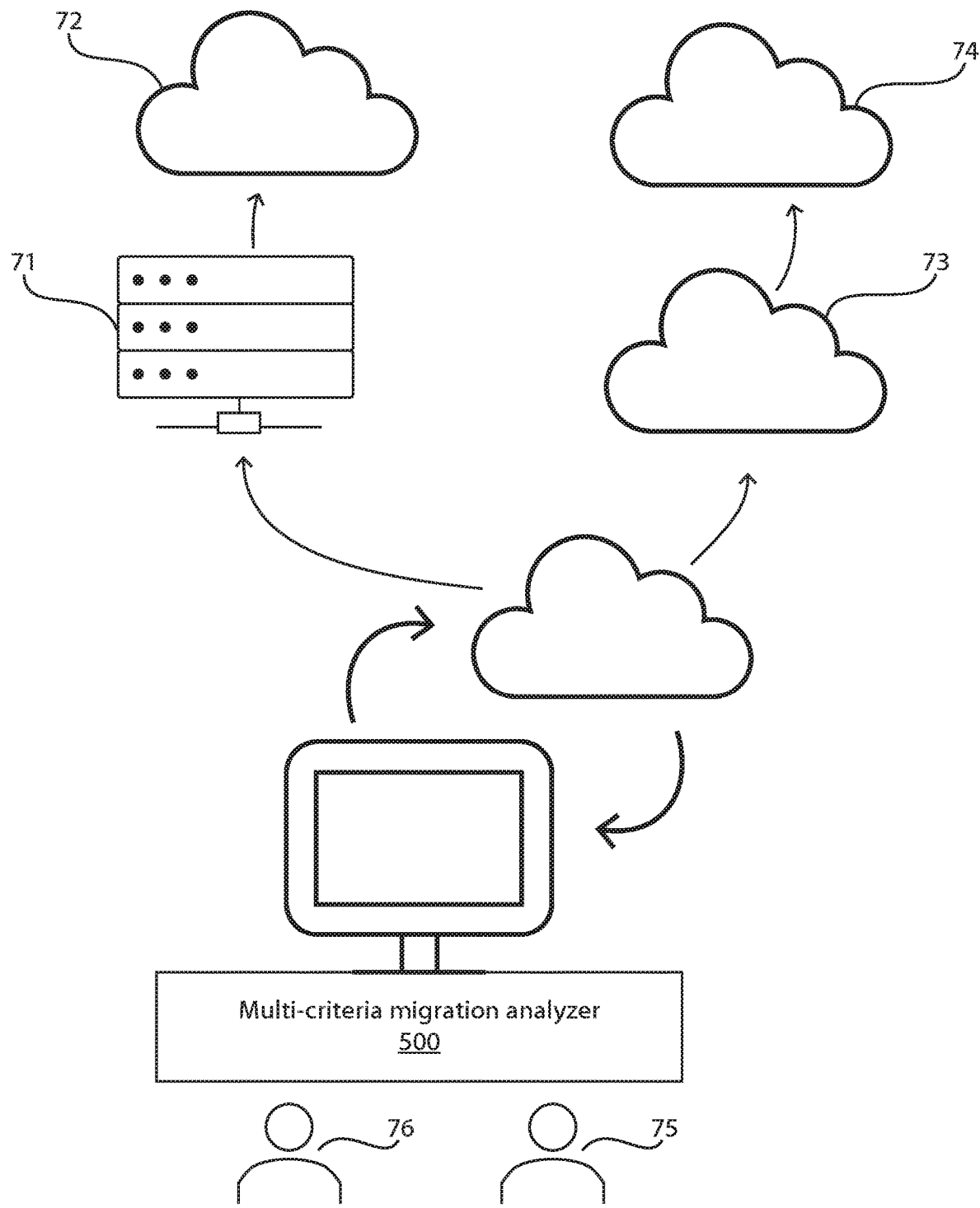
FIG. 4 is an illustration indicating migration of applications from local environments to a cloud environment, or migration of an application from an existing cloud provider to a new cloud provider.

FIG. 1 illustrates one embodiment of an offline line learning cycle for a method for migration of local applications to a cloud environment using a multi-criteria (key performance indicator (KPI)) migration analyzer. FIG. 2 illustrates one embodiment of runtime prediction of workloads from a business environment for migration to the cloud using model built using the process flow depicted in FIG. 1. FIG. 3 depicts one embodiment of system including the multi-criteria (key performance indicator (KPI)) migration analyzer. FIG. 4 is an illustration indicating migration of applications from local environments to a cloud environment, or migration of an application from an existing cloud provider to a new cloud provider.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIGS. 1 and 2 are describing the one embodiment of the workflow of building and training a 'Normalization Model' for underlying key performance indicators (KPIs) of a workload to be migrated, as well as a 'Classification Model' for predicting the probability of a successful migration of a specific workload with its underlying KPIs. Blocks 1-7 in FIG. 1 are describing one embodiment of the workflow to tune and train the 'Normalization Model'. Blocks 8-11 in FIG. 1 are describing the workflow to build and tune the 'Classification Model' based on historic data of successful or unsuccessful migration initiatives. Blocks 12-15 in FIG. 2 are describing the workflow to use the Normalization and Classification Model in order to predict the probability of migration success of a new workload to be considered to move to a cloud environment. The specific key performance indicators (KPIs) of this new workload are normalized with the Normalization Model of FIG. 1, and all these workload parameters are being used to get a prediction from the Classification Model. Blocks 16-19 in FIG. 2 are used to simulate single and combined changes on the underlying KPIs that will lead to different probability predictions of the Classification Model being used. In cases where some changes of the underlying KPIs will significantly improve the probability of success, the most impacting KPIs are captured and transformed in recommendations what parameters of the KPIs should be refactored to make the migration as much successful.

Referring to FIG. 4, in some embodiments, a multi-criterial migration analyzer 500 as depicted in FIG. 3 is employed to execute the methods described in FIGS. 1-2. The migration may be from a local environment 71, such as a mainframe computer, to a cloud environment 72. In other embodiments, the migration may be from a first cloud environment 73, on which the application is currently being run, to a second cloud environment 74, which may be provided by one or more new cloud providers. The cloud environments 72, 73, 74 may each be provided by a single provider or multiple providers (e.g., multi-cloud migration). Entry of key performance indicators into the multi-criteria migration analyzer 500 may be by a user 75, e.g., client that is utilizing the application. A subject matter expert (SME) 76 may also interact with the multi-criterial migration analyzer 500 to participate in confirming the accuracy of learning steps in developing models for estimating the likelihood of successful migrations for the applications.

In one embodiment, the multi-criteria cloud-migration analyzer can analyze the feasibility of migration of a suitable application landscape to multi-provider cloud environment basis of a multiple set of criteria across multiple dimensions. Dimensions are used to indicate the various categories of KPIs (acting as criteria) and spanning across business, technical, service, architecture, operational, etc. The dimensions may include business based applications, technical applications, service type applications, architectural applications, operational applications, etc.

The multi-criteria cloud-migration analyzer can dynamically analyze migration of workloads as fit for purpose for a specification dimension for a hybrid, multi-vendor and/or multi-cloud environments. Based on machine learning, the transformative KPI scoring of multiple criteria basis of the various KPIs from multiple dimensions as business continuity, service quality, operational maturity, associated costs, etc. In some embodiments, KPIs are not only covering pure technical aspects like CPU cores, storage, and network connections, but also business resilience aspects with depending high availability and disaster recovery components, as well as process maturity aspects, for instance how well patch management and incident management is executed in the IT environment. In some embodiments, the methods and structures described herein, can produce a heat-map to indicate the probability of the success of migration basis of the tuning of the multiple KPIs.

In some instances, the probability of an unseen workload getting successfully migrated to cloud is predicted with very high success rates, e.g., the success rate for migration can be greater than 90%. In these cases, a simulation is not needed to get recommendations on what KPIs, and elements of the workload should be tuned or altered to increase the success probability. In other cases, the probability for success is low. For example, the probability of success can be close to 50%, or less. In these instances, a simulation step can be employed to get additional insights of what most impactful KPIs can be changed to increase the success probability.

The multi-criteria cloud migration analyzer can act as a simulator to provide recommendations for increasing the probability of a successful migration scenario. For instance, to what extent important parameter/KPIs should be adjusted to promote a successful migration, or when predicted as problematic scenario how to turn it in a successful one. Examples of adjustable tuning features include an operating system (OS) change, and/or middleware architecture changes. The multi-criteria cloud migration analyzer can provide recommendations on what migration steps are most likely successful such as 'refactored middleware', 'rehosted with different OS level' etc)\. The multi-criteria cloud migration analyzer can recommend a go-no-go decision for a client whether it is ready for migration and a given workload if it is ready for migration. The multi-criteria cloud migration analyzer can include a self-learning mechanism with a KPI tuning predictive model (with various KPIs, KPI dimensions, KPI associations for a successful/failed migration, etc.), and can include continuous feedbacks from the historic migration issues. In some embodiments, the multi-criteria cloud migration analyzer can create new KPI definitions for a successful criteria of migration basis of the historic lessons learnt and KPI predictive models; and can provide feedback on KPI weights, transform curves, classifiers, etc.

Referring to FIG. 1, in some embodiments, the method may begin with building a model of key performance indicators (KPIs) for determining suitability of local applications for migration to the cloud. Setting up the model of KPIs can be performed by a KPI evaluation engine 24 of the multi-criteria migration analyzer 500. Creating the model includes two phases. There is a phase to set up the features space, and a phase that incorporates historic migration analysis and classification. Blocks 1-7 of FIG. 1 can set up the feature space and provide an offline learning cycle of KPI normalization. In some embodiments, these steps can be provided by a KPI normalizer 25 of KPI evaluation engine 24 for the multi-criteria migration analyzer 500 that is depicted in FIG. 3.

The key performance indicators (KPIs) can be for a number of dimensions, such as service quality statistics, business continuity and availability, and operational maturity and efficiency. Examples of KPIs for service quality statistics can include % major service incidents associated with a workload; mean time to resolve (MTTR)(this is a KPI criteria that is used to measure the time to resolve incident tickets as to how much time the ticket was open deviation) against best practices for incidents caused by workload issues; and % users dissatisfied with quality of service (# of complaint records). Examples of KPIs for business continuity and availability can include availability vs. recovery service level agreement (SLA) attainment index, delays in completing risk assessments/business impact analysis on schedule, and % successful training results for business continuity (BC)/disaster recover (DR) (BC/DR) team members. Examples of KPIs for operational maturity and efficiency can include an average central processing unit (CPU) utilization of servers hosting the workload, relative performance of workload transaction requests, and % unhandled of logged exceptions of workload.

Figure 5:
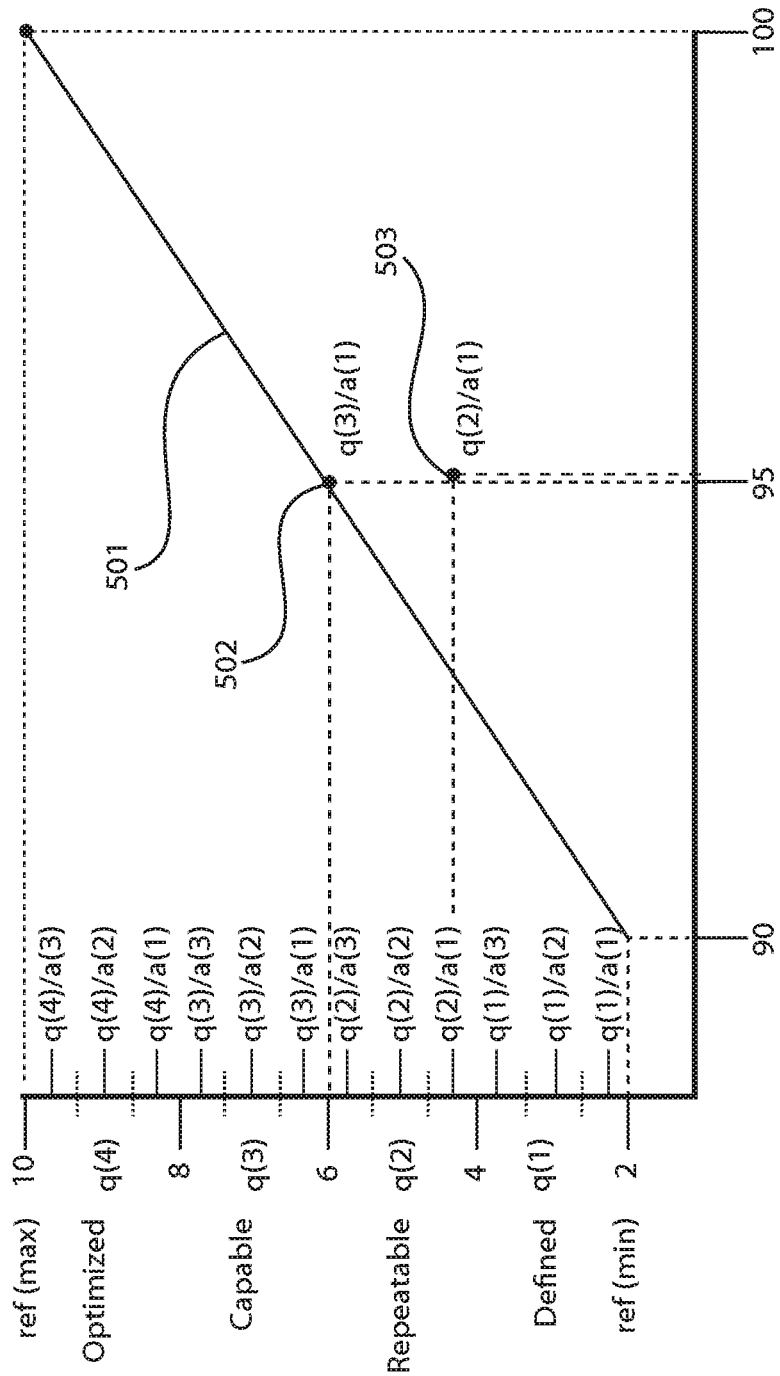
FIG. 5 is a plot of key performance indicators (KPI) normalization with supervised learning, in accordance with one embodiment of the present disclosure.

The steps of providing a model of key performance indicators for determining suitability of local applications for migration to the cloud at blocks 1-7 of FIG. 1 may be repeated for each KPI. As depicted in FIG. 3, a KPI normalizer 25 may include inputs 26 for a plurality of KPI values identified by KPI_1, KPI_2, KPI_3 to KPI_n. For each KPI, the KPI normalizer 25 outputs a normalizing function approximated by a normalizing model that can be represented by the normalized plot 501, as depicted in FIG. 5.

Blocks 1-7 of FIG. 1 illustrates a process flow for an offline learning cycle of key performance indicator (KPI) normalization. Normalization is a process wherein data is reorganized to be used in the analysis of the present disclosure. As different KPIs have different meanings in terms of quality (e.g. what means poor, moderate, good quality), the first step is to define the range of data of each KPI.

At block 1, the process flow may include defining a minimum value and a maximum value for a range of data that quantifies each key performance indicator (KPI). For example, when the KPI is expressed in a percentage, a range of percentages is set to equal a specific performance level. For example a range of 0% to 100% can be divided into four portions, e.g., 0-20%, 21-50%, 51-80% and 81-100%.

Referring to block 2 of the method flow illustrated in FIG. 1, the method can include transforming different meanings of each KPI (with their specific data ranges from block 1) to one reference scale that can be used across all KPIs. For this step, a machine learning based Normalization Model for each KPI has to be trained in support of Subject Matter Expert's (SME's)(supervised model) that determine interpolation points how a specific data point of KPI is transformed to a data point on the reference scale. The training step may include both historical KPI's, as well as KPI's that have been determined by the multi-criteria migration analyzer 500 to provide an increased likelihood of successful migration.

In some embodiments, at block 2 the method may continue with normalizing the KPI values to a reference scale with an initial linear transformation. A linear transformation is a change to a variable characterized by one or more of the following operations: adding a constant to the variable, subtracting a constant from the variable, multiplying the variable by a constant, and/or dividing the variable by a constant. In one example, the initial liner transformation is provided by a general formula with defined quality ranges qj and areas ak, and ref(min)/ref(max) on reference scale, as follows:

$$v(qj, ak) = ref(\min.) + \frac{(ref(\max.) - ref(\min.))}{q(\max.)} * q(j) \frac{(ref(\max.) - ref(\min.))}{q(\max.) * a(\max.) * 2} - \frac{(ref(\max.) - ref(\min.))}{q(\max.) * a(\max.)} * a(\max + 1 - k)$$

In order to get the subject matter experts (SMEs) to determine interpolation points, the reference scale is divided into 2 levels of categories. One level is referred to as a quality section that is noted as q(j) with j: 1 . . . m section. For instance, if there are 4 quality sections, the meaning of the quality sections can be the following: q(1)='poor quality', q(2)='moderate quality', q(3)='good quality', q(4)='very good quality'. In order to make the interpolation points more fine-grained, a sub-scale within each quality section is introduced which is referred to as area (noted as a(k) with k: 1 . . . n areas within each quality section). For example, if there are 3 areas as a sub-scale in each quality section, the meaning of the areas could be the following: a(1)='lower area', a(2)='medium area', a(3)='higher area'. Consequently, each interpolation point on the reference scale can be determined by a pair of q(j)/a(k). For example, the pair q(2)/a(1) means the interpolation point is in second quality section on the lower area of the reference scale.

As the subject matter expert (SME) 76 in the supervised learning model is defining the pair of quality section, and area within this section (thus defining the meaning of a certain data point of the KPI under evaluation), the formula is translating the interpolation point on the continuous reference scale. The reference scale can have a minimum value and a maximum value referred to as ref(min) and ref(max), which is plotted in FIG. 5. In a following step, q(max) is introduced denoting the maximum number of quality sections q(j), and a(max) denotes the maximum number of areas a(k) within each quality section. Respectively, a(max+1-k) is denoted as the number of area depending on k (e.g. a(1) is transformed in a(3+1−1)=a(3)). In the example with interpolation point q(2)/a(1), the formula will translate the interpolation point v(q(j), a(k)) to a certain value on the reference scale.

In one example, the scale can including a value ranging from one (1) to four (4). Normalizing the KPI minimum and maximum values to the normalized scale may be as follows: 0-20% being q(1)/a(1) on the scale, 21-50% being q(2)/(a(2) on the scale, 51-80% being q(3)/a(3) on the scale and 81-100% being q(4)/a(4) on the scale, as depicted in FIG. 5.

In one example of training a KPI normalization for a service quality statistic, the cluster criteria may set the percent (%) of business disruptions due to IT service incidents is equal to 90%. The criteria may further include the percent of business stakeholders satisfied with IT service delivery meeting agreed on service levels is equal to 70%. The criterial may further include a percent of users satisfied with the quality of IT service delivery being equal to 40%. In yet another example, the criteria for migration may include the percent MTTR for major incidents that caused degradation of service being equal to 30%.

In one example of training a KPI normalization for business continuity and availability, the cluster criteria may include the percent of services covered in a business continuity plan/service availability plan being equal to 40%. The cluster criteria for training the KPI normalization may further include a percent frequency of review IT continuity plan being equal to 20%. The cluster criteria for training the KPI normalization for business continuity and availability may further include a percent of business processes with continuity agreements being equal to 30%.

In one example of training a KPI normalization for operational maturity and efficiency, the cluster criteria may include technology metrics such as (CPU) utilization of servers, storage space utilized, network status (e.g., speed, bandwidth utilization) and average uptime (availability of technology). In another example of training a KPI normalization for operational maturity and efficiency, the cluster criteria may include process metrics such as number of changes that are rolled back within a month, average incident response time in a month, percentage of employees who attended to task on time, average time to complete a process. In an even further example of training a KPI normalization for operational maturity and efficiency, the cluster criteria can include service metrics, such as cost of executing a service transaction via different channels, efficiency of service, which is based on the average time to complete a specific service.

In an even further example of training a KPI normalization for operational maturity and efficiency, the cluster criteria can include service metrics, such as cost of executing a service transaction via different channels, efficiency of service, which is based on the average time to complete a specific service.

KPI normalization on a reference scale may be an indication of operational maturity. The reference scale may be a scale ranging from 1 to 10. In one example, the reference scale has five (5) defined values, e.g., 2, 4, 6, 8 and 10. For example, a value of 2-4 may be defined as "defined" (q(1)) for describing a migration; a value of 4-6 may be defined as "repeatable" (q(2)) for describing a migration; a value of 6-8 may be defined as "capable" (q(3)) for describing a migration; and a value of 8-10 may be defined as "optimized" (q(4)) for describing a migration, as depicted in FIG. 4. The term 'repeatable' denotes a repeatable migration execution of service tasks (environment or process operation), however not sufficient for sustainability, robustness, and consistency. The term 'defined' denotes some standards for migration being defined and executed, however efficiency and measures on quality still in developmental stage. The term 'capable' denotes a migration state of increasing achievements of efficiency with improved and adapted processes. There is attention on refinement and testing in multiple and varied conditions. The term 'optimized' denotes a migration state that is very effective through continually improving process performance by incremental changes and innovation.

Figure 6:
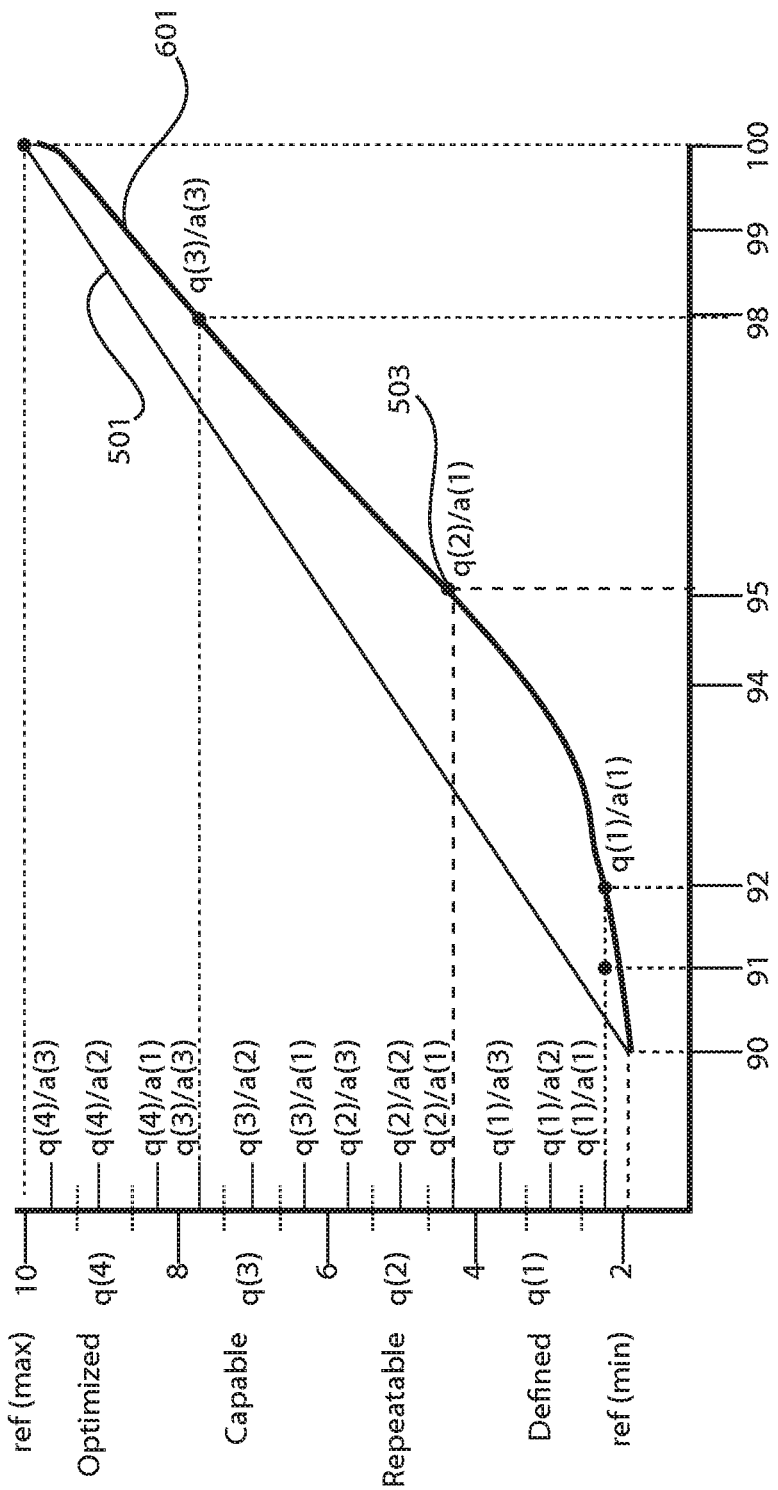
FIG. 6 is a plot of key performance indicators (KPI) normalization in support of interpolation data, in accordance with one embodiment of the present disclosure.
Figure 7:
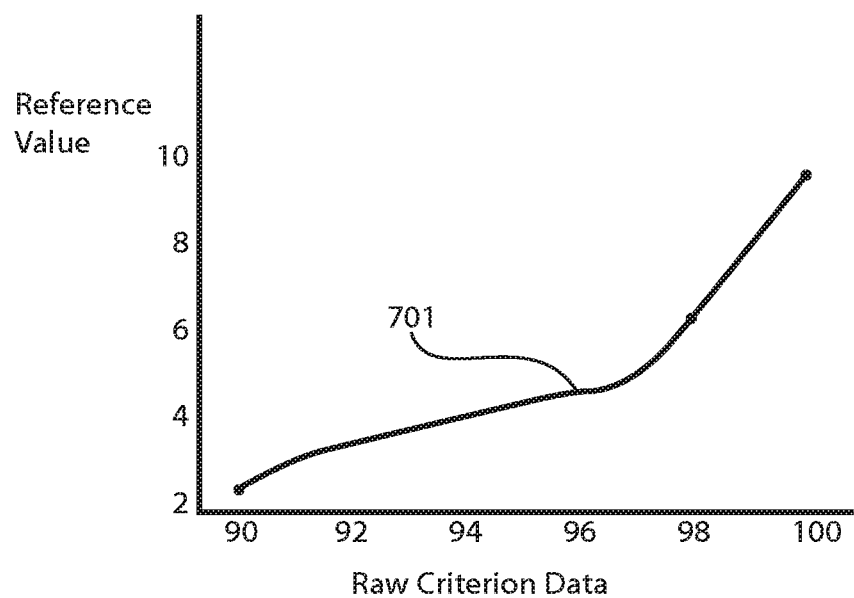
FIG. 7 is plot of key performance indicator (KPI) normalization with polynomial function approximation.

FIG. 5 is a plot of key performance indicators (KPI) normalization with supervised learning. The plots depicted in FIGS. 5-7 are plots of model based approximations of the linear normalization of the KPIs being considered.

The key performance indicator being plotted in FIG. 5 with plot line 501 is the % Relative Performance of Workload Transaction Requests (#sat tran+(#tolerated tran/2))/total tran). In the plot that is depicted in FIG. 5, the KPI for the relative performance of workload transactions has a value 95%. Having a meaning of 95% for transaction requests are satisfied/tolerated is initially approximated with a linear transformation of the KPI scale to the reference scale.

In this example with reference scale with range [2, 10], the performance value 95 from criterion range [90, 100] will be initially approximated to reference value 6 (mapped to quality range 3/area 1). This is illustrated by data point plot 502 in FIG. 5. In a supervised learning cycle, the subject matter expert (SME) 76 can now re-evaluate the quality/area of this performance value and provide a new quality such as q(2)/a(1). In the example depicted in FIG. 5, this is illustrated by data point plot 503, which is mapping to 4.33 on reference scale.

Referring to FIG. 1, in a following step at block 3, the process can continue with getting subject matter expert (SME) feedback on random KPI values within the defined range, on how those values match the reference scale for suitability for migration to the cloud. This provides confirmation regarding what values for KPI's indicate that a migration will be successful.

At block 4 of the method depicted in FIG. 1, the process may continue with deriving a transformation function of subject matter expert (SME) feedback on provided KPI interpolation points with polynomial approximation. In some embodiments, block 4 may include a general formula with a Vandermonde Matrix [V], coefficient vector [c], and [y] representing the vector of all interpolated points: [V]*[c]=[y].

In some embodiments, following the subject matter expert (SME) has determined interpolation points of mapping KPI data points to quality section/areas on the reference scale, a continuous transformation function can be approximated by means of these interpolation points. The Lagrange polynomials are used for the polynomial interpolation and approximation. The applied Lagrange interpolation method is making use of the Vandermonde matrix [V] holding the data point values of the KPI as x-vector values within the matrix. The calculated data points on the reference scale are denoted as y-vector values in [y]. With the Lagrange polynomials denoted as [V]*[c]=[y], the formula can resolve the vector [c] which are the coefficients of the transformation function.

As a result the 'Normalization Model' is built by the approximation of the transformation function [y]=[V]*[c].

Blocks 3 and 4 may be repeated in an iterative step.

FIG. 6 is an example plot of key performance indicators (KPI) normalization in support of interpolation data. The plot in FIG. 6 includes the same example KPI that is plotted in FIG. 5. In FIG. 6, the data line identified by reference number 601 is the initially approximated transformation graph, which is the same plot as provided in FIG. 5 that included data point 503. In some embodiments, by getting feedback from the subject matter expert (SME), newly evaluated quality/area ranges can be captured and transformed to reference values as plotted by the data line identified by reference number 601.

Having captured those interpolation points (e.g. q1/a1, q2/a2, q3/a3), a function f(x) can be approximated by estimating the transformation graph using a polynomial approximation, as depicted in FIG. 6.

Referring to FIG. 1, the method may further include to capture coefficients of transformation function for each key performance indicator (KPI) at block 5.

FIG. 7 is plot 701 of key performance indicator (KPI) normalization with polynomial function approximation. The plot in FIG. 7 includes the same example KPI that is plotted in FIG. 6. The approximation function is as follows:

$$F(x)=0.7*x(4)-133.14*x(3)+12613.32*x(2)-597140.4*x+1.130202514E7$$

In the example depicted in FIG. 7, there are six (6) interpolation points of which we are calculating 6 equations with a polynomial representation. In some embodiments, Lagrange's polynomial coefficients (e.g., of order 6) are used to solve these equations.

Each equation is represented as matrix row (of matrix V) of i-th order polynom (i=0 ... 5) of input variable x, e.g.: [x(5) x(4) x(3) x(2)×1]

Each matrix row will be multiplied by the common coefficient vector [c], e.g.: [0.0 0.7 −133.14 12613.32 −597140.4 1.13E7]

This is an example of how the transformation function is approximated in support of the Lagrange polynomials formula with 6 sample interpolation points. The formula is employed in building a supervised learning 'Normalization Model' with KPIs with different meanings and scales. By applying the polynomial approximation, comparable, normalized KPI values can be transformed and used to fit the subsequent 'Classification Model'.

Referring to FIG. 1, the method may continue to block 6, which includes continuing to build the offline model with a historic migration analysis and classification. The historic migration analysis and classification phase of building the offline model may include blocks 6-11 of FIG. 1. Blocks 6-11 may be performed by a classification model generator 27 for the KPI evaluation engine of the multi-criteria migration analyzer 500.

Producing the classification model of historic cloud migration scenario may begin with getting the KPI values of a migration scenario at block 6. This is done for each historic cloud migration scenario to be analyzed. The step of getting the KPI values of a migration scenario at block 6 may be provided by a database of migrated workload features in the classification model generator 27 of the multi-criteria migration analyzer 500 of the system depicted in FIG. 3.

Referring to block 7 using the transformation function derived in block 5 each KPI value can be normalized.

At block 8, the process can continue with manually labeling the class of cloud migration scenarios indicating their status. For example, the class of cloud migration can be labelled as a 'Success', as being 'Problematic', etc. Block 8 is a step that may be supervised by a subject matter expert (SME).

Referring to block 9, the method may continue with training a random forest classification model with labeled migration scenario data. Random forests or random decision forests are an ensemble learning method for classification, regression and other tasks that operate by constructing a multitude of decision trees at training time and outputting the class that is the mode of the classes (classification) or mean prediction (regression) of the individual trees.

Block 10 includes tuning the classification model with a number of decision trees used in ensemble, and other parameters (e.g. depth of trees, scope of KPIs). Ensemble learning is the process by which multiple models, such as classifiers or experts, are strategically generated and combined to solve a particular computational intelligence problem. One common example of ensemble modeling is a random forest model. This approach to data mining leverages multiple decision trees, a type of analytical model that's designed to predict outcomes based on different variables and rules. A random forest model blends decision trees that may analyze different sample data, evaluate different factors or weight common variables differently. The results of the various decision trees are then either converted into a simple average or aggregated through further weighting.

Referring to FIG. 1, in some embodiments, the method includes deriving a classification model of cloud migration scenarios based on KPI input data at block 11. In some embodiments, the classification model is used by the classification model generator 27 of the multi-criterial migration analyzer 500 that is depicted in FIG. 2 to provide a model through which key performance indicators (KPIs) of local applications are analyzed to estimate their readiness for migration to an offsite location.

In some embodiments, the classification model can predict class membership for an entity based on a set of relevant input features. The classes, e.g., class membership, can include a successful migration or a problematic migration. As noted, the migration can be for an application that is run locally, and the user wishes for the application to be moved to a cloud provider. The migration can also be used to move an application from a first cloud provider to a second cloud provider. The input features are the KPI inputs, e.g., KPI_1, KPI_2 . . . KPI_n.

In some embodiments, the goal of the process sequence depicted in FIG. 1 is to fit a model that quantifies the impact of the considered input features on whether a cloud migration is problematic or not. Such model can for example compute the probability of a migration being problematic from the set of considered KPIs (input features). In some embodiments, the model not only to identifies the problematic migration instances (which can be done solely based on the historic data) but also to capture which KPI attributes (or combinations of KPI attribute values) are impacting the observed migration issue.

In some examples, the classification of historic cloud migration issues may include a design that employs a classification tree approach to separate the migration cases into problematic (migration_readiness=1) and successful ((migration_readiness=0). This step may be performed in block 10 of the method illustrated in FIG. 1.

In one example, in which the excerpt of cluster criteria for the KPI criterion (data element) is service quality statistics, the KPI criteria may be one of a number of business disruptions due to IT service incidents, a percent of business stakeholders satisfied that IT service delivery meets agreed-on service levels, and/or a percent of users satisfied with the quality of IT service delivery. In one example, the migration issues may include that the Target server is not optimized for business service level agreements (SLAs). A failure responsible score may be equal to approximately 70%. In another example, the migration issues may include large lead times to integrate with the managed services. For this example, a failure responsible score may be equal to approximately 70%. In yet another example, migration issues may include monitoring agents not deployed during migration. For this example, a failure responsible score may be equal to approximately 20%.

In one example, in which the excerpt of cluster criteria for the KPI criterion (data element) is business, continuity and availability, the KPI criteria may be one of a number of services covered in business continuity plan/service availability plan, frequency of review of IT continuity plan and/or percent of business processes with continuity agreements. In one example, the migration issues may include a lack of scripts to validate high availability scenarios post migration. For this example, a failure responsible score may be equal to approximately 40%. In another example, the migration issues may be migration failing on disaster recovery (DR) orchestration. For this example, a failure responsible score may be equal to approximately 20%. In yet another example, the migration issue may include the broken entity relationships of Biz-IT elements. For this example, a failure responsible score may be equal to approximately 90%.

In one example, in which the excerpt of cluster criteria for the KPI criterion (data element) is Operational Maturity & Efficiency, the KPI criteria may be one of a technology metrics, such as (CPU) utilization of servers, storage space utilized, network status (e.g., speed, bandwidth utilization) and average uptime (availability of technology); process metrics, such as number of changes that are rolled back within a month, average incident response time in a month, percentage of employees who attended to task on time, average time to complete a process; and service metrics such as cost of executing a service transaction via different channels, efficiency of service, which is based on the average time to complete a specific service. In one example, the migration issues may include a migration test failing on performance measurements. For this example, a failure responsible score may be equal to approximately 20%. In another example, the migration issues may include over-utilization of the migration subject matter expert (SME). For this example, the failure responsible score is equal to approximately 10%. In yet another example, the migration issues can include operational efficiencies not being achieved. For this example, the failure responsible score is equal to approximately 90%.

Referring to FIG. 2, the method may continue to a runtime prediction of workloads from a business environment for migration to the cloud. The runtime prediction may include the migration probability engine 28 that is a component of the multi-criteria migration analyzer 500. The runtime prediction may include blocks 12-15 of FIG. 2. The method depicted in FIG. 2 may be repeated for each workload in the business environment. The method may begin at block 12 with capturing KPI values according to workload and business environment factors. These are the values for the application that the user is wishing to determine whether the application is ready for migration from a local environment to a remote provider, e.g., cloud based environment. The prediction can be on a real time basis using real time live data on a target KPI type.

At block 13, each KPI value is normalized with a transformation function derived in the process flow depicted in FIG. 1 including block 5.

At block 14, the method can continue with getting a major vote of ensemble of decision trees as part of random forest classification model. Referring to block 15, in some examples, if the probability of an unseen workload being successfully migrated to a new cloud environment is predicted with a high success rate, such as being greater than 90%, in those cases no simulation is needed to get recommendations of what KPIs and elements of the workload should be tuned or altered to increase the success probability. In this example, if there is a high probability of success at block 14, the process flow can continue to block 16. At block 16, the method further includes capturing a prediction class label, such as "Success" or "Problematic", alongside with probability of prediction. The prediction class label may include an indication of "success" or "problematic".

Referring to FIG. 2, in other examples, the probability for success from block 14 can be low, e.g., close to 50% or lower. In this instance, in which the probability of success for migration is low at block 15, a simulation may be run at block 17. The simulation at block 17 is provided to get additional insights what most impactful KPIs should be changed to increase the success probability significantly.

At block 17, the method can include running a "what if" simulation scenario by varying KPI value stepwise lower/higher for prediction. This step is run for each KPI value in the prediction data set. This step of the process flow provides a recommendation of suitability for the application that is currently being run on a local environment to a remote environment, e.g., in a cloud environment. This step is provided by the recommendation engine 29 of the multi-criteria migration analyzer 500 depicted in FIG. 3. The recommendation engine 29 may perform steps 16-18 of the process flow depicted in FIG. 2. The migration simulation may vary multiple KPIs, and vary different combinations of KPIs across, across multiple dimensions to identify various factors that influence the probability of success for a migration.

At block 18, the method for the runtime prediction of workloads from business environment for migration to the cloud further includes capturing the simulated class label with its probability and compare it against previously captured prediction probability.

At block 19, the method can continue with evaluating the impact of delta probabilities and focus on those KPIs having enhanced the probability of a successful migration.

At block 20, the method can include capture feedback from successful KPI iterations to tune KPI Normalization and classification model. This step may be provided by the training module 30 of the multi-criteria migration analyzer 500 that is depicted in FIG. 3. The training module 30 may employ machine learning.

In some embodiments, the method and system can include transformation and normalization process to convert KPI criteria (e.g. workload criticality, target service affinity, business resiliency aspects etc.) into specific quality units/areas and present those on a reference scale.

KPI criteria have their own contribution weightage to overall score of 'Cloud Migration Candidacy', as well as KPI cluster (where criteria of same types are aggregated—e.g. business alignment KPIs) have a specific weightage. The 'Machine Learning Cycle' initially starts with a linear transformation of KPI criteria based data values to the reference scale representing common maturity levels of cloud migration aspects. The Machine Learning cycle is two-fold: on one hand there is a super vised learning cycle with SME feedback on what criteria values are belonging to what quality range (re-evaluation of quality/area assessment). On the other hand there is an unsupervised learning path derived from analysis of previous cloud migration success criteria. The analysis provide a saturation index of specific criteria (e.g. low end or high end saturation of the function graph) and additionally the gradient force (normalized by the target weighting of criteria) on the respective weightages. The machine learning cycle may be executed by the training module 30.

With the ongoing supervised feedback new interpolation points are captured that can be considered as changes of the transformation function to reference values on the reference scale.

In support of these interpolation points, a function f(p1, q1(a1), p2, q2(a2) . . . ) is approximated by estimating the transformation graph using a polynomial approximation. For the polynomial approximation the general Lagrange Polynomial formula is used:

Pn(x)=f0L0(x)+f1L1(x)+ . . . +fnLn(x) with with Lj(x) defined as Lagrange Coefficient Polynomial, and Lj(x)=((x−x0)*(x−x1) . . . (x−xj−1)*(x−xj+1) . . . (x−xn))/((xj−x0)*(xj−x1) . . . (xj−xj−1)*(xj−xj+1) . . . (xj−xn))

The new transformation function is calculated by first getting the Lagrange's polynomial coefficients with a matrix representation of n equations for the n unknown coefficients. With A defined as Vandermonde matrix and b as vector of coefficients, the n equations for the respective coefficients can be presented as [A][b]=[f(x(i))]. The coefficient vector b can be derived by multiplying the inverse matrix A with the evaluated values for each interpolation point (vector f(xi)).

With the new transformation function found, the new KPI score is derived by transforming each criterion contributing to the appropriate KPI with its new weight w' to c' value on the reference scale (function f(c1', w1', c2', w2' . . . ). The new transformation function can be input into the model derived in blocks 1-11 of FIG. 1.

The methods and systems depicted in FIG. 1-3 may provide to the user 75 a report predicting likelihood of a successful migration of an application to one or more cloud providers. The report can provide the likelihood of successful migration based upon the KPIs of the application being considered for migration. Further, the report can provide suggested modifications to the application, e.g., modified KPIs, to further increase the likelihood of a successful migration. The report may be displayed on an interface of a computing device through which the user is interacting with the multicriteria migration analyzer 500. In some instances, the multicriteria migration analyzer 500 can modify the application using the recommendation including the modified KPIs In another aspect, a system is provided that employs a multi-criteria migration analyzer 500 to predict successful migration of applications based on key performance indicators, as depicted in FIG. 3. The system may include a key performance indicator evaluation engine 25 for producing a migration model from historical key performance indicators. The key performance indicator evaluation engine 25 may include a key performance indicator normalizer 25 for providing a normalized scale of non-successful to successful migration of applications based on the historical key performance indicators. The key performance indicator evaluation engine 25 also includes a classification model generator 27 for transforming the normalized scale into the migration model.

The system may further include a migration probability engine 28 for evaluating input key performance indicators for a target application migration in the migration model to provide an output for a probability of successful migration.

The system further includes a recommendation engine 29 for executing a simulation employing the migration model, wherein migration modifying key performance indicators are input into the migration model for the simulation. The recommendation engine 29 provides for modification of the target application to increase a likelihood of a successful migration. The modification can include the key performance indicators that increase the probability of success of migration in the simulation to be greater than the output for the probability of successful migration from the migration probability engine.

In some embodiments, the multi-criteria migration analyzer 500 further includes a training module 30. The multi-criteria migration analyzer 500 may also include a hardware processor 31 configured for performing the above described steps. The bus 102 interconnects the plurality of components in the system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.). In some embodiments, the hardware processor subsystem can include and execute one or more software elements. The one or more software elements can include an operating system and/or one or more applications and/or specific code to achieve a specified result. In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs. These and other variations of a hardware processor subsystem are also contemplated in accordance with embodiments of the present invention.

Figure 8:
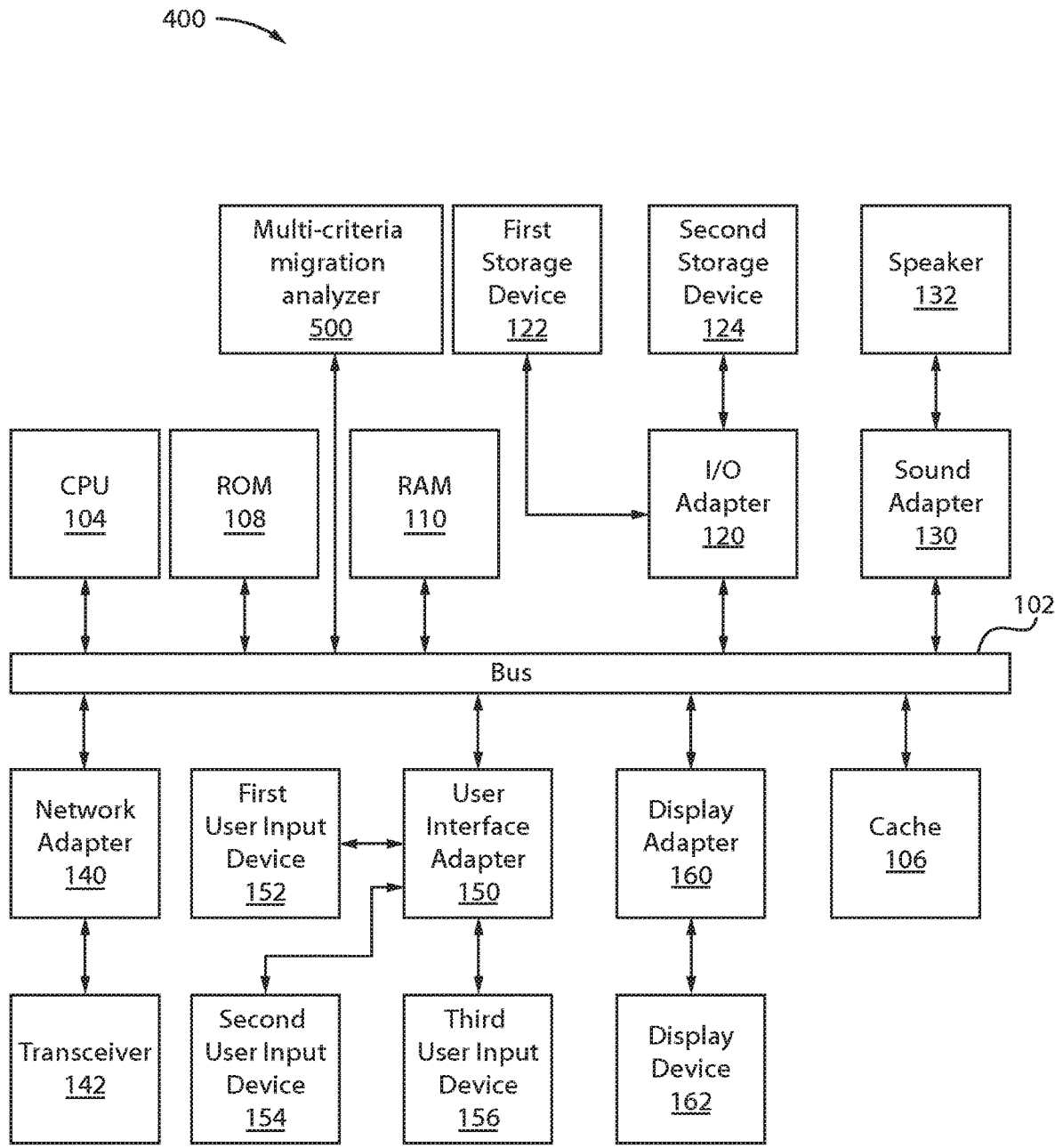
FIG. 8 is a block diagram illustrating a processing system that can incorporate the system for application migration that is depicted in FIG. 3, in accordance with one embodiment of the present disclosure.

Additionally, the system 500 that is depicted in FIG. 3 may be integrated into the processing system 400 depicted in FIG. 8. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 7, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product that includes a non-transitory computer readable storage medium having computer readable program code embodied therein for migrating local applications to a remote provider. The program instructions executable by a processor to cause the processor to use historic migration data to label key performance indicators (KPIs) in a migration model including a scale that indicates a level of successful migration to a remote provider. The program instructions further include employing, using the processor, the migration model to predict successful migration of a application having one or more of said one or more of local key performance indicators for the local application. The program instructions further include migrating the local application to a remote provider when the model to predict successful migration indicates a greater than threshold value for successful migration.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings:

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
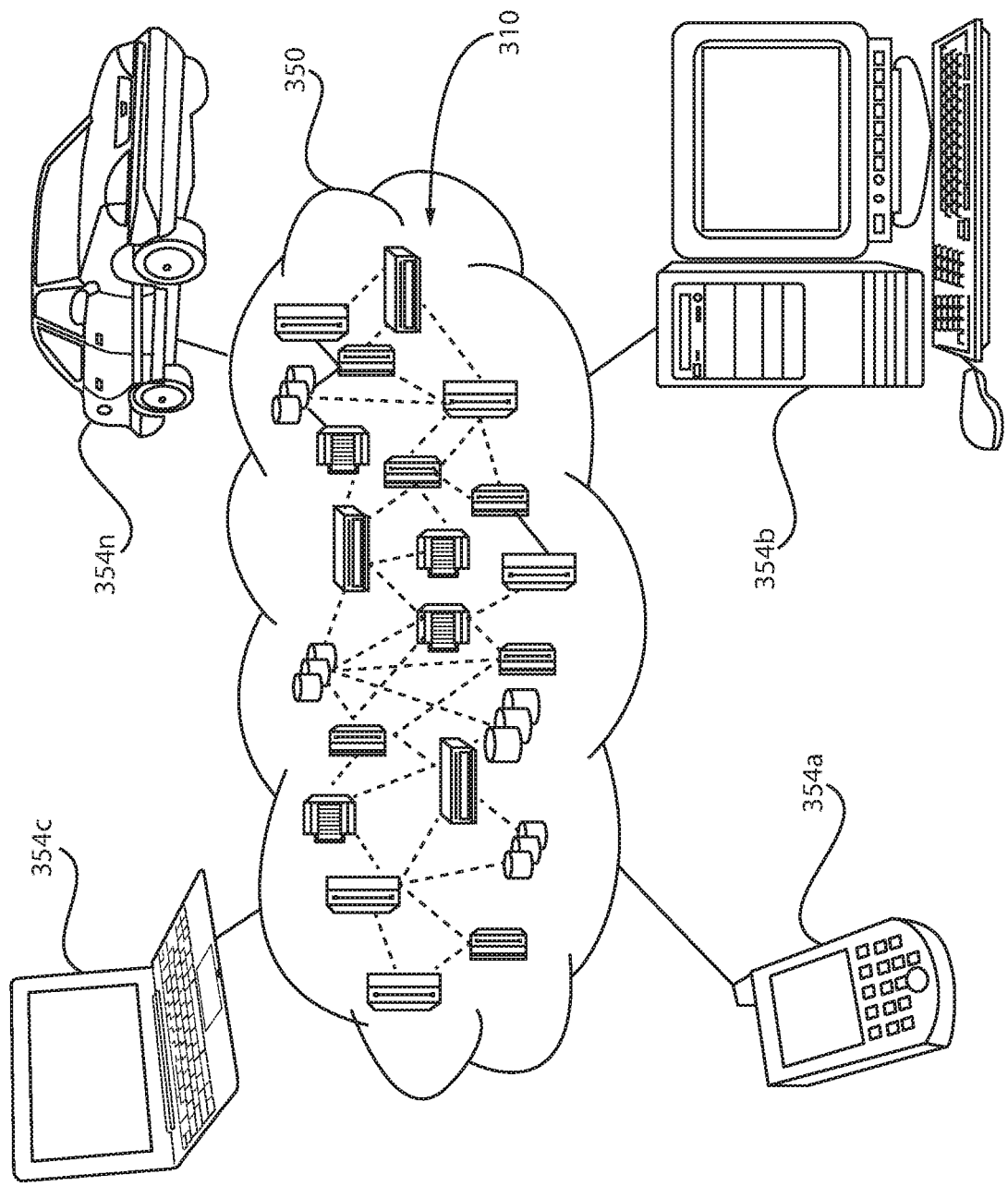
FIG. 9 depicts a cloud computing environment according to an embodiment of the present disclosure.

Referring now to FIG. 9, illustrative cloud computing environment 350 is depicted. As shown, cloud computing environment 350 includes one or more cloud computing nodes 351 with which local computing devices used by cloud consumers, such as, for example, mobile and/or wearable electronic devices 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 8 are intended to be illustrative only and that computing nodes 351 and cloud computing environment 350 can communicate with any type of computerized device over any type of network and/or network addressable connection (e.g., using a web browser).

Figure 10:
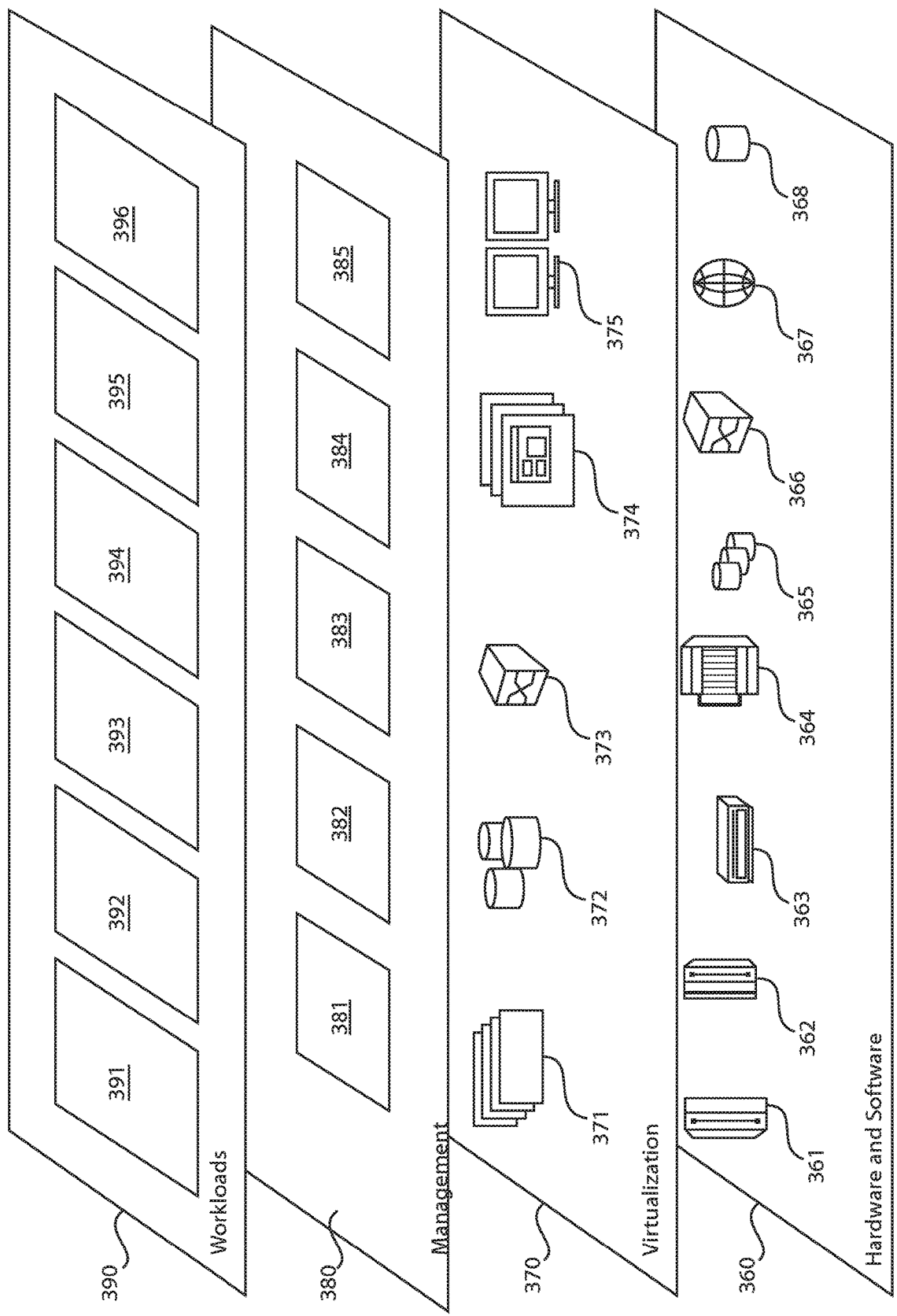
FIG. 10 depicts abstraction model layers according to an embodiment of the present disclosure.

Referring now to FIG. 10, a set of functional abstraction layers provided by cloud computing environment 350 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 75.

In one example, management layer 380 may provide the functions described below. Resource provisioning 81 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and application 396 for the methods of migrating applications from a local environment to a remote environment, e.g., cloud environment, as described with reference to FIGS. 1-9.

Having described preferred embodiments of a system and method for machine learning for determining suitability of application migration from local to remote providers, it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims.

What is claimed is:

1. A computer implemented method for migrating applications comprising:
normalizing historical key performance indicators to provide a normalized scale of non-successful to successful migration of applications based on historical values;
transforming the normalized scale into a migration model;
entering input key performance indicators for a target application migration into the migration model to provide an output for a probability of successful migration;
executing a simulation employing the migration model, wherein migration modifying key performance indicators are input into the migration model for the simulation; and
modifying the application for successful migration with key performance indicators that increase the probability of success of migration in the simulation to be greater than the output for the probability of successful migration from the migration model.

2. The computer implemented method of claim 1, wherein the migrating applications are migrated from a local environment to a cloud environment.

3. The computer implemented method of claim 1, wherein the migrating applications are migrated from a first cloud environment provider to a second cloud environment provider.

4. The computer implemented method of claim 1, wherein the migration model produces a heat map indicating a probability of success for migration.

5. The computer implemented method of claim 1, further comprising using the migration model in a simulation with KPIs of local applications to further train the migration model.

6. The computer implemented method of claim 5, wherein said training the migration model comprises machine learning.

7. The computer implemented method of claim 1, further comprising confirming the migration model with a subject matter expert.

8. A system to predict successful migration comprising: a processor
a key performance indicator evaluation engine for producing a migration model from historical key performance indicators, wherein the key performance indicator evaluation engine comprises a key performance indicator normalizer for providing a normalized scale of non-successful to successful migration of applications based on the historical key performance indicators;
a migration probability engine for evaluating input key performance indicators for a target application migration in the migration model to provide an output for a probability of successful migration; and
a recommendation engine for executing a simulation employing the migration model, wherein migration modifying key performance indicators are input into the migration model for the simulation, wherein the recommendation engine provides for modification of the target application to increase a likelihood of a successful migration, the modification including the key performance indicators that increase the probability of success of migration in the simulation to be greater than the output for the probability of successful migration from the migration probability engine.

9. The system of claim 8, wherein the key performance indicator evaluation engine includes a classification model generator for transforming the normalized scale into the migration model.

10. The system of claim 8, wherein the target application is migrated from a local environment to a cloud environment.

11. The system of claim 8, wherein the target application is migrated from a first cloud environment provider to a second cloud environment provider.

12. The system of claim 8, wherein the migration probability engine produces a heat map indicating a probability of success for migration.

13. The system of claim 8, wherein said training the migration model comprises machine learning.

14. The system of claim 8, wherein the migration model makes predication of modifications to the local application to provide for a successful migration of the local application to the remote provider.

15. A computer program product for migrating applications comprising a computer readable storage medium having computer readable program code embodied therewith, the program instructions executable by a processor to cause the processor to:
normalize, using the processor, historical key performance indicators to provide a normalized scale of non-successful to successful migration of applications based on historical values;
transform, using the processor, the normalized scale into a migration model;
enter, using the processor, input key performance indicators for a target application migration into the migration model to provide an output for a probability of successful migration;
execute, using the processor, a simulation employing the migration model, wherein migration modifying key performance indicators are input into the migration model for the simulation; and
modify, using the processor, the application to increase the likelihood of a successful with key performance indicators that increase the probability of success of migration in the simulation to be greater than the output for the probability of successful migration from the migration model.

16. The computer program product of claim 15, wherein the migrating applications are migrated from a local environment to a cloud environment.

17. The computer program product of claim 15, wherein the migrating applications are migrated from a first cloud environment provider to a second cloud environment provider.

18. The computer program product of claim 15, wherein the migration model produces a heat map indicating a probability of success for migration.

19. The computer program product of claim 15, further comprising an input by a subject matter expert to confirm the migration model.

* * * * *